United States Patent
Ow et al.

(10) Patent No.: US 7,611,091 B2
(45) Date of Patent: Nov. 3, 2009

(54) HIGH SPEED VERTICAL TAKE-OFF AND LAND AIRCRAFT WITH ACTIVE FAN BALANCING SYSTEM

(75) Inventors: Gordon Y. W. Ow, Long Beach, CA (US); Donald J. Trent, La Mirada, CA (US)

(73) Assignee: Go Aircraft Ltd., Long Beach, CA (US)

( * ) Notice: Subject to any disclaimer, the term of this patent is extended or adjusted under 35 U.S.C. 154(b) by 637 days.

(21) Appl. No.: 11/401,666

(22) Filed: Apr. 11, 2006

(65) Prior Publication Data
US 2007/0235582 A1    Oct. 11, 2007

(51) Int. Cl.
*B64C 11/34* (2006.01)
(52) U.S. Cl. .................. 244/17.13; 244/12.2; 244/12.3; 244/23 C; 73/458; 73/468
(58) Field of Classification Search .............. 244/17.13, 244/12.1, 12.2, 12.3, 23 A, 23 B, 23 C; 73/66, 73/455, 458, 461, 468
See application file for complete search history.

(56) References Cited

U.S. PATENT DOCUMENTS

| | | | |
|---|---|---|---|
| 2,667,226 A | 1/1954 | Doblhoff | |
| 2,863,261 A | 12/1958 | Davis | |
| 2,988,152 A | 6/1961 | Katzenberger et al. | |
| 3,182,929 A | 5/1965 | Lemberger | |
| 3,327,969 A | 6/1967 | Head | |
| 3,514,053 A | 5/1970 | McGuinness | |
| 4,452,410 A | 6/1984 | Everett | |
| 4,773,618 A | 9/1988 | Ow | |
| 5,039,031 A | 8/1991 | Valverde | |
| 5,099,430 A * | 3/1992 | Hirsch | 73/462 |
| 5,197,010 A * | 3/1993 | Andersson | 73/457 |
| 5,507,453 A | 4/1996 | Shapery | |
| 5,738,302 A | 4/1998 | Freeland | |
| 6,382,560 B1 * | 5/2002 | Ow | 244/23 C |

* cited by examiner

*Primary Examiner*—J. Woodrow Eldred
(74) *Attorney, Agent, or Firm*—King & Schickli, PLLC

(57) ABSTRACT

A high-speed vertical take-off and land aircraft includes a body with an engine supported by the body. A fan assembly is also carried by the body. The fan assembly includes a hub and a plurality of blades to provide vertical lift for the aircraft. A plurality of frictionless air bearings vertically support the fan assembly while a plurality of idler wheels horizontally center the fan assembly. In addition the aircraft includes an active system for sensing vibration and balancing the fan assembly.

21 Claims, 5 Drawing Sheets

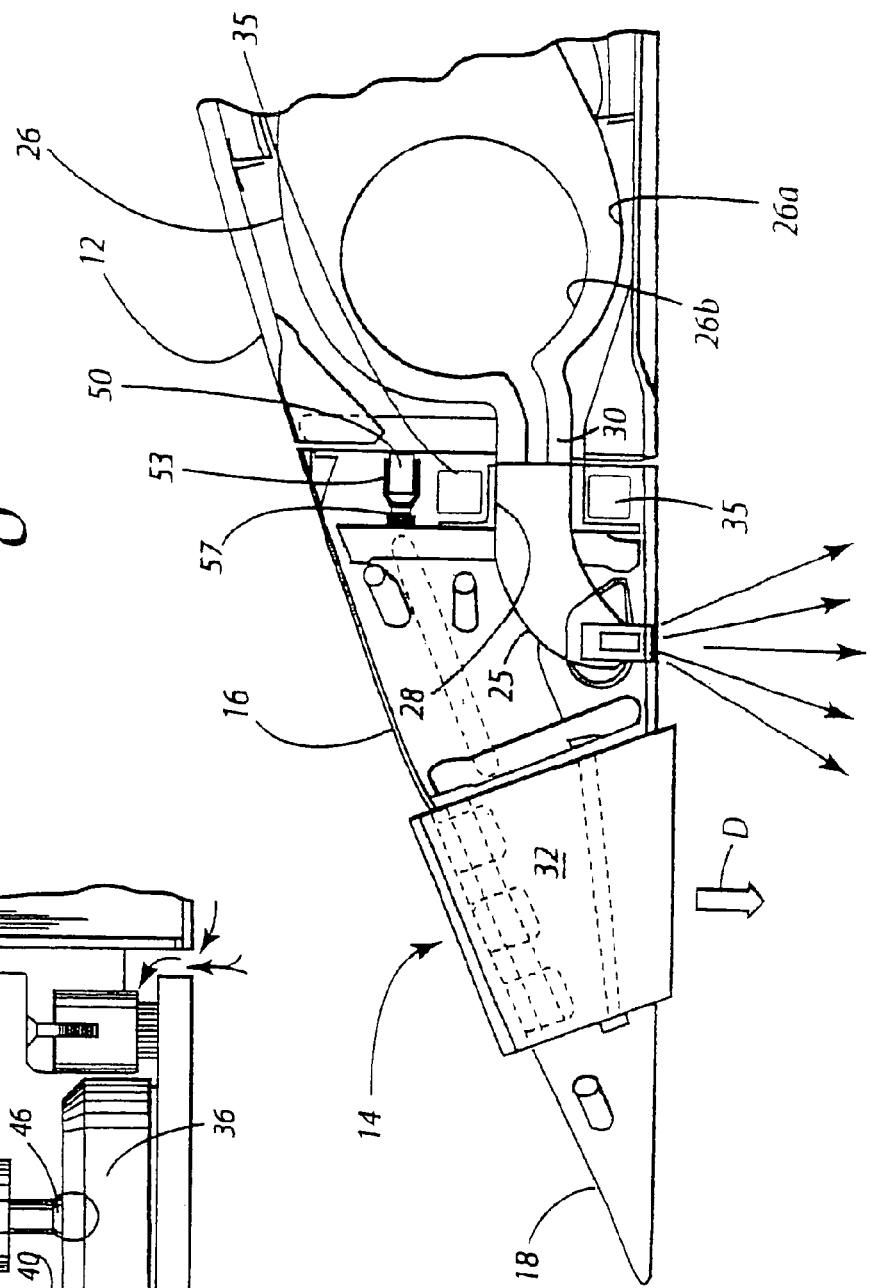
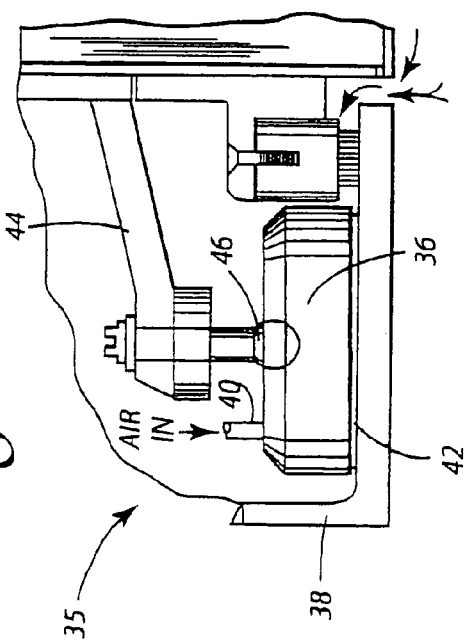

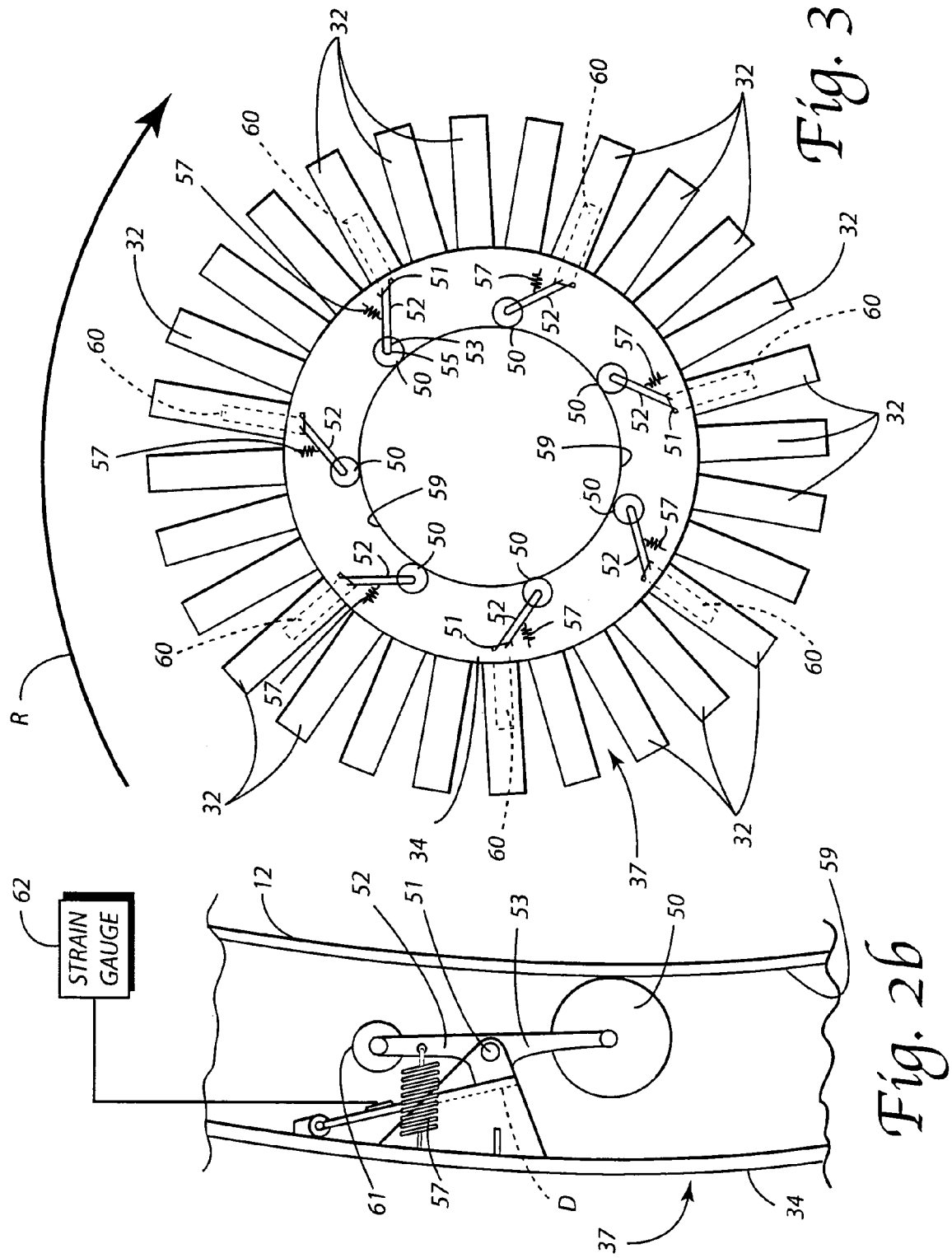

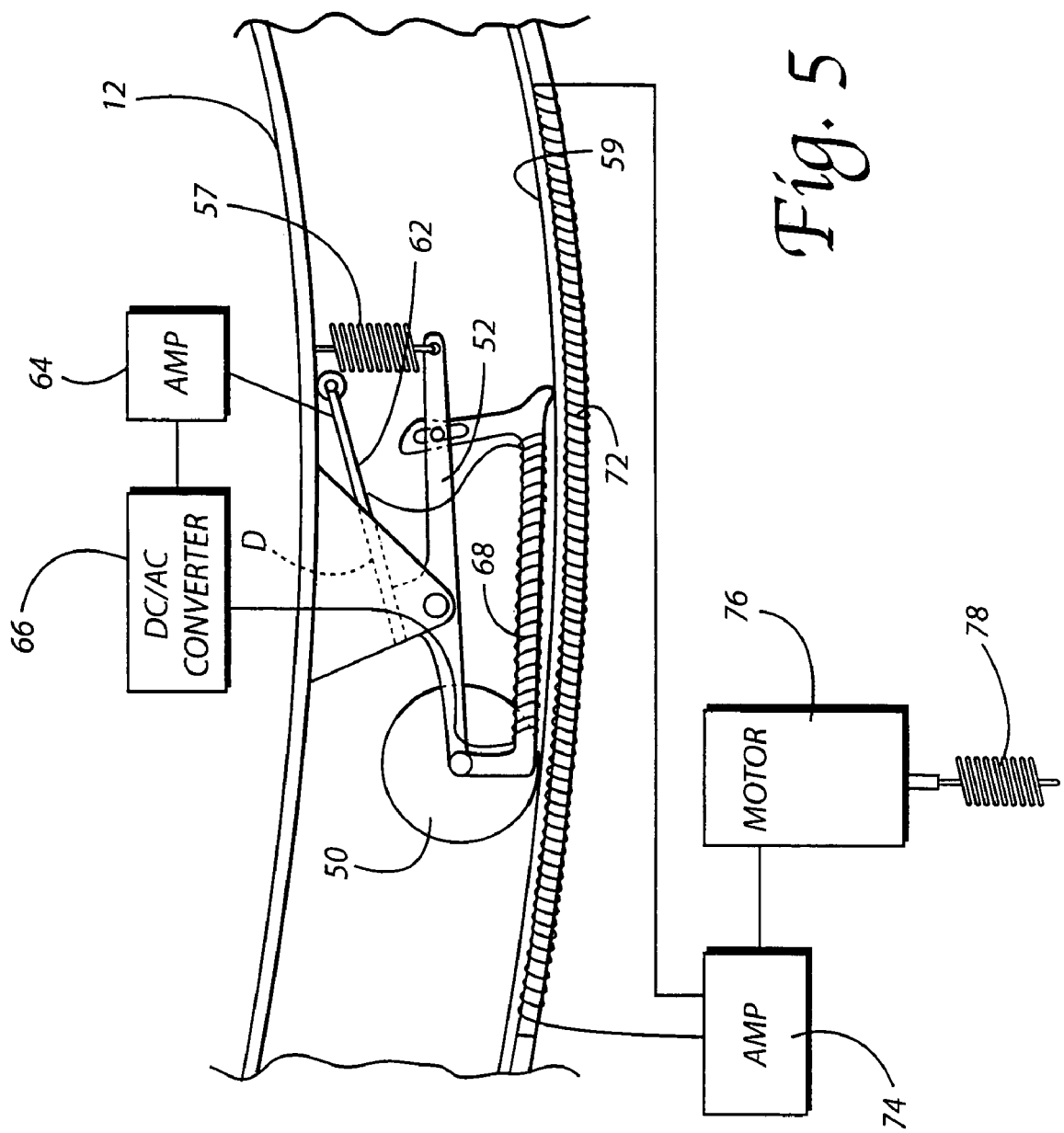

ature, obvious aspects all without departing from the invention. Accordingly, the drawings and descriptions will be regarded as illustrative in nature and not as restrictive.

HIGH SPEED VERTICAL TAKE-OFF AND LAND AIRCRAFT WITH ACTIVE FAN BALANCING SYSTEM

TECHNICAL FIELD

The present invention relates generally to aircraft and, more particularly, to an aircraft with improved features for enhanced vertical take-off and landing (VTOL) capabilities and high speed (HS) horizontal flight.

BACKGROUND OF THE INVENTION

U.S. Pat. No. 6,382,560 to Ow discloses a high speed vertical take-off and land (HSVTOL) aircraft. The aircraft includes a disk-shaped fuselage with a rotatable fan assembly having a nozzle ring driven by hot jet gases and fan air from jet engines. High efficiency air bearings serve to support the rotatable fan assembly on the fuselage in the vertical direction and rollers around the perimeter provide horizontal support and stability. The present invention relates to an improvement of this basic design by incorporating an active system for sensing vibration and balancing the fan assembly as it is rotated.

SUMMARY OF THE INVENTION

In accordance with the purposes of the present invention, an improved HSVTOL aircraft is provided. The aircraft includes a body with an engine, such as a jet engine, supported by the body. A fan assembly is also carried by the body. That fan assembly includes a hub and a plurality of blades to provide vertical lift for the aircraft. A first bearings mechanism vertically supports the fan assembly while a second bearings mechanism horizontally centers the fan assembly. In addition the aircraft includes an active system for sensing vibration and balancing the fan assembly. The second bearings mechanism may take the form of a plurality of idler rollers.

The body includes a continuous race. Each of the plurality of idler rollers is held on a rocker arm pivotally mounted to the hub. The plurality of idler rollers engage and roll along the continuous race equally spaced around the 360° arc thereof. The active system includes at least one vibration sensor and at least one displaceable balancing weight. The at least one vibration sensor is connected to one idler roller of the plurality of idler rollers.

In accordance with additional aspects of the present invention the at least one sensor may be a strain gauge. The one idler roller of the plurality of idler rollers is carried on a rocker arm and the strain gauge is connected to the rocker arm. In addition the strain gauge is connected to an amplifier, a DC/AC converter and a primary coil. The at least one balancing weight is carried on one blade of the plurality of blades. Further the at least one balancing weight is connected to a screw jack. A motor is connected to and drives the screw jack. An amplifier and an induction coil are connected to that motor.

In an alternative embodiment, the hub includes the continuous race and each of the plurality of idler rollers is held on a rocker arm pivotally mounted to the body.

In accordance with an additional aspect of the present invention a method is provided for controlling vibration in a HSVTOL aircraft equipped with a fan assembly. The method comprises the steps of sensing vibration produced by the fan assembly and radially displacing weights along one or more blades of the fan assembly to balance the fan assembly and control vibration.

In the following description there is shown and described a preferred embodiment of the invention, simply by way of illustration of one of the modes best suited to carry out the invention. As it will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain certain principles of the invention. In the drawings:

FIG. 2 is an enlarged cross sectional and partially schematical view in the transitional area between the fuselage and the fan assembly illustrating in detail the fan assembly and the annular interface hub of the fuselage;

FIG. 2a is a further enlarged, partially cross sectional view of an upper air bearing module (similar to a lower air bearing module, not shown) and the peripheral brush seal positioned in the annular hub of the fuselage;

FIG. 2b is yet another enlarged, partially schematical view illustrating the mounting of an idler roller to the hub of the fan assembly;

FIG. 3 is a schematical top plan view illustrating the active system for sensing vibration and balancing the fan assembly;

FIG. 5 is a view similar to FIG. 2b but showing an alternative embodiment wherein the idler roller is mounted on the fuselage.

Reference will now be made in detail to the present preferred embodiment of the invention, an example of which is illustrated in the accompanying drawings.

DETAILED DESCRIPTION OF THE INVENTION

Figure 1:
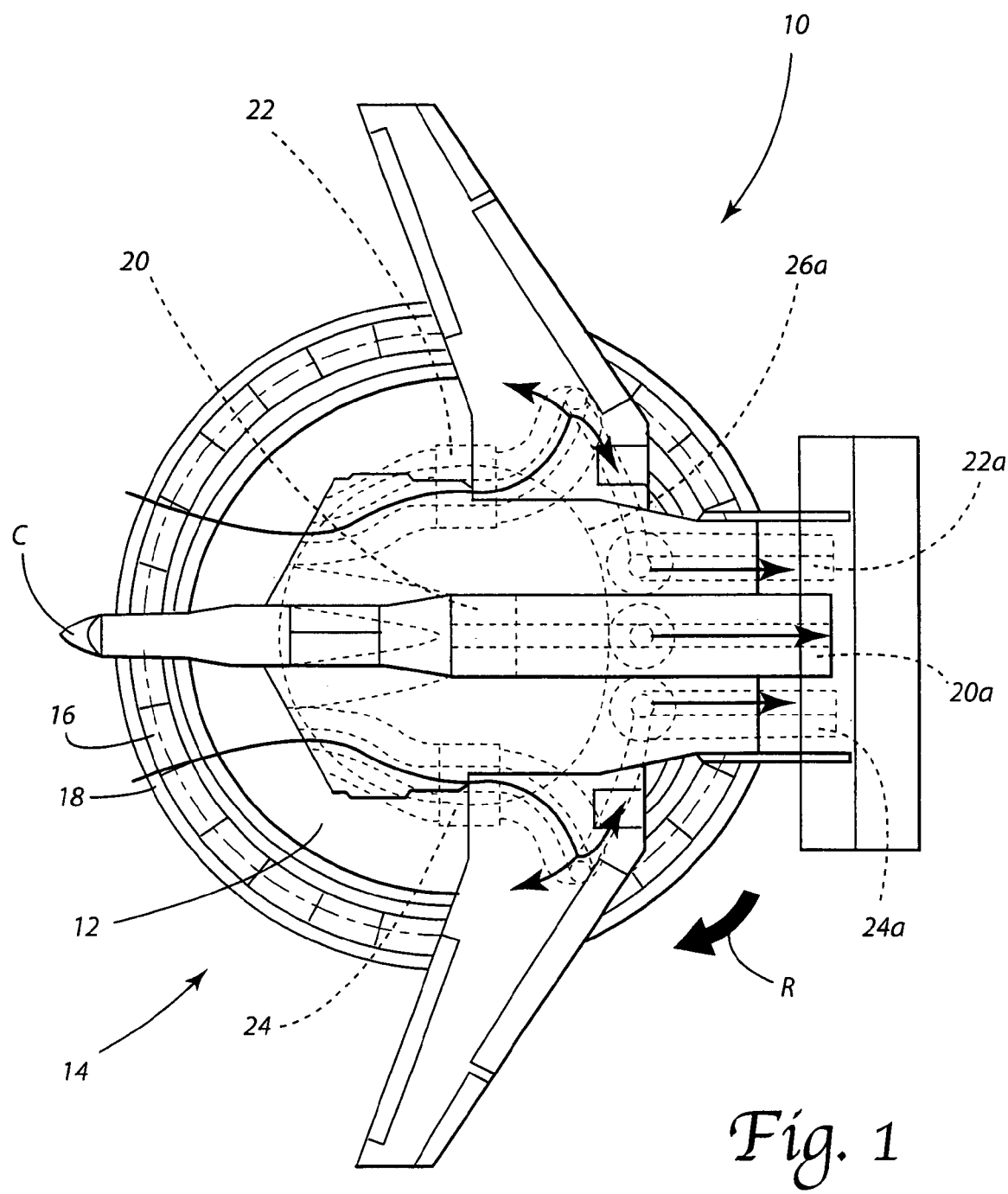
FIG. 1 is an overall top view of the HSVTOL aircraft of the present invention illustrating in dashed outline the schematic arrangement of the fan jet engines and composite feed ducts, plenum and other components.

Reference is now made to FIG. 1 illustrating the HSVTOL aircraft 10 of the present invention. The aircraft 10 is similar in design to that disclosed in my prior U.S. Pat. No. 6,382,560, the full disclosure of which is incorporated herein by reference. The center of the aircraft 10 is formed by a disk-shaped fuselage or body, generally designated by reference numeral 12. An outer fan assembly 14 surrounds the fuselage 12 and includes an inboard nozzle ring 16 with the perimeter being defined by a full periphery rim or shroud 18. The interface between the fuselage 12 and the nozzle ring 16 is provided with a rotary bearing and seal arrangement that allows the fan assembly 14 to freely rotate with respect to the fuselage 12. As described, the rotary motion is in the clockwise direction, and is generally represented by the action arrow R in FIG. 1. A pod mounted fan jet engine 20 extends along the horizontal axis of the aircraft 10 behind the pilot canopy C. Two additional fan jet engines 22 and 24 are viewed in dashed line form since in this preferred embodiment these two engines are submerged within the fuselage 12.

As made clear in my previous U.S. Pat. No. 6,382,560, an onboard CPU controller operates the engines 20, 22, 24 as well as all of the other flight components of the aircraft 10. A control stick or similar manual or automatic interface is employed by the pilot to fly the aircraft 10 through the controller. Flight attitude transducers can also be provided to provide input. Further, the onboard CPU controller, GPS and radio systems enable optimal unmanned autonomous operation.

The exhaust from the fan jet engines 20, 22, 24 is provided to an array of nozzles 25 that are arrayed around the full periphery of the nozzle ring 16 through an annular, composite duct plenum 26 (see also FIG. 2). The plenum 26 includes an outer duct 26a that contains only relatively cool fan air from the annular fan section of the engines 20, 22, 24. The inner duct 26b contains the hot core gases. It will be realized that this separation is maintained in the aircraft 10 so as to allow the use of lighter weight and less expensive duct material and to protect components from the deleterious effects of the core gases. As the gases are discharged from the nozzles 25, the fan assembly 14 is rotated with respect to the fuselage 12 to provide vertical lift.

More specifically describing the invention, the nozzle ring 16 is the component of the fan assembly 14 that is mated with the outer periphery of the fuselage 12. Each of the nozzles 25 are held in a separate segment of the nozzle ring 16. Between the nozzle ring 16 and the plenum 26 is a transition zone through which the exhaust is transferred to the nozzle ring 16. A peripheral series of nozzle intake receptors 28 are formed on the inboard face of the nozzles 25. Similarly, a plurality of matching feed orifices 30 are positioned peripherally around the fuselage 12 and communicate with the composite plenum 26. Through these interacting orifices 30 and the rapidly moving receptors 28, the supply of jet separated exhaust core gases and fan air is efficiently transferred.

The exhaust from the nozzles 25 extends down at an approximately 15° angle and is ejected at high speed at this optimal angle through a restricted nozzle orifice. The nozzle ring 16 being inboard of the fan assembly 14 provides the appropriate spin action to the fan assembly without interference with the individual fan blades 32. After transitioning from vertical to horizontal flight, the exhaust from the fan jet engine 20 is gradually redirected through extension ducting and out of the tailpipe 20a. Similarly, the engines 22 and 24 have tailpipes 22a, 24a for horizontal cruise propulsion. The redirection of flow from these engines 22, 24 takes place directly through the section of the composite duct plenum extending along the aft quadrants of the aircraft.

The fan assembly 14 comprises a selected number of individual fan blades 32 illustrated rotating in the clockwise direction as noted by action arrow R in FIGS. 1 and 3. These blades 32 extend upwardly at a selected angle of attack designed to provide optimum performance.

As illustrated schematically in FIG. 3, the plurality of fan blades 32 are mounted to or carried by a fan hub 34. A first bearings mechanism 35 serves to support the fan assembly 14 on the fuselage 12 in the vertical direction (see FIGS. 2 and 2a). The bearings mechanism 35 includes air cushion modules 36 forming an annular tract for vertical support by engagement along the top and bottom of an annular support race 38 of the fan assembly 14. Each of the modules 36 includes a pressurized air inlet 40. A thin air gap 42 allows controlled escape of the pressurized air around the periphery of the module 36, thus providing an air cushion support. A plurality of brackets 44 that are spaced equally around the periphery of the aircraft 10 supports the modules 36 individually on a gimbel 46 to allow free floating action.

A second bearings mechanism 37 (see FIGS. 2b, 4 and 5) serves to center the fan assembly 14 in the fuselage 12 (see also FIG. 3). In the illustrated embodiment the mechanism 37 comprises spaced idler rollers 50 connected to the fan hub 34 by rocker arms 52. More specifically and as best illustrated in FIG. 2b, each rocker arm 52 is pivotally connected to the inner wall of the fan hub 34 by means of a trunnion 51 so as to allow the rocker arm to freely pivot. A first end of the rocker arm 52 includes a yoke 53 for holding the associated idler roller 50 by means of a shaft 55 about which the roller freely rotates. A second end of the rocker arm 52 includes a counter weight 61 (not needed for alternative embodiment shown in FIG. 5). A preload spring 57 mounted between the fan hub 34 and the rocker arm 52 provides a force that biases the idler roller 50 toward the continuous race 59 extending around the fuselage 12.

The preload springs 57 function to provide a radial preload on the idler rollers 50 that works to maintain centering of the fan assembly 14 on the fuselage 12. The radial preload results in generating a tangential friction force on the fuselage 12 from the rollers 50. The preload is sized to balance the impulse from the engine gases passing from the orifices 30 in the fuselage 12 into the receptors 28 of the fan assembly 14. The impulse from the engine gases works in a direction opposite to the tangential friction force from rollers 50. More specifically, engine exhaust gases exit the fuselage 12 at an angle of approximately 60 degrees which results in an overall impulse of approximately 894 lbs. For a fifteen foot diameter fan assembly 14, preload force for each of seven idler rollers 50 will be approximately 1300 lbs. Such a preload creates an overall frictional force that counteracts the impulse force while maintaining the centering of the fan assembly 14 on the fuselage 12 up to an unbalance force of 0.73 ounces at approximately 880 RPM.

As illustrated in FIG. 3, the idler rollers 50 are equally angularly spaced 360° around the fan hub 34 to engage and roll along the continuous race 59. Seven idler rollers 50 are illustrated in FIG. 3 at spaced intervals of approximately 51.43°. While seven idler rollers 50 are illustrated, it should be appreciated that more or less could be provided (e.g. nine idler rollers spaced at 40° intervals and six idler rollers spaced at 60° intervals).

Figure 4:
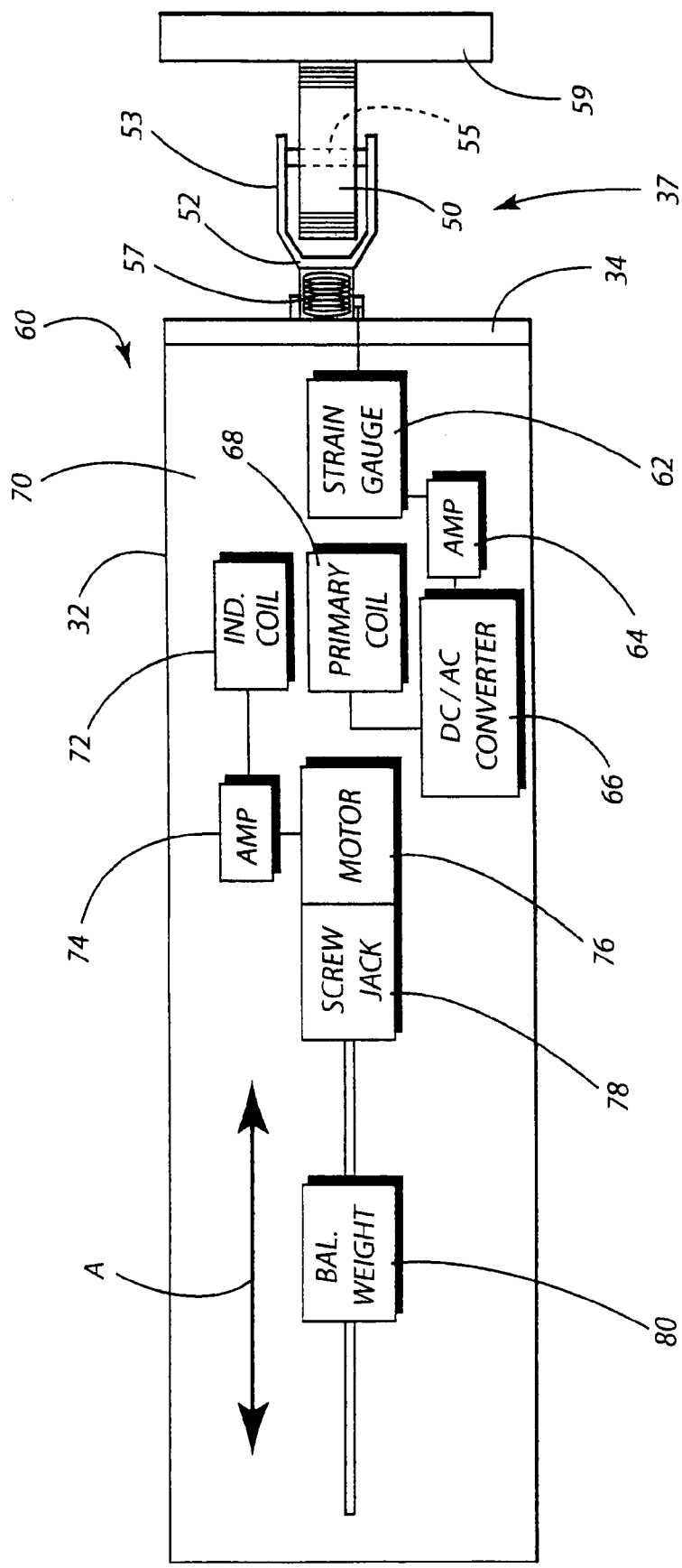
FIG. 4 is a schematical view illustrating the details of the active system as they relate to a single blade of the fan assembly.

An active system, generally designated by reference numeral 60 and best illustrated in FIGS. 3 and 4, is provided for sensing vibration and balancing the fan assembly 14 during its rotation relative to the fuselage 12. In the illustrated embodiment, the system 60 includes multiple strain gauges 62. One strain gauge 62 is mounted to a lever D which is sized to bend linearly within the operating range of the strain gauge. Each lever D is connected to each rocker arm 52 that supports the rollers 50. Thus, there are seven strain gauges 62 in all. Each strain gauge 62 is connected to additional components of the system 60 including an amplifier 64 that is connected to a DC/AC converter 66 that is in turn connected to a primary coil 68 that is associated with an induction coil 72, another amplifier 74, a motor 76, a screw jack 78 and a balancing weight 80. The various system components 64, 66, 68, 72, 74, 76, 78 and 80 associated with a strain gauge 62 may all be held in an internal cavity 70 in the fan blade 32 adjacent the rocker arm 52 and strain gauge 62. Where seven sensors or strain gauges 62 are provided, seven related component systems are mounted in the internal cavity 70 of the adjacent fan blades 32. Thus, if the fan assembly 14 includes a total of twenty-eight fan blades 32, every fourth blade is equipped with a displaceable balancing weight 80 and the related system components 62, 64, 66, 68, 72, 74, 76 and 78.

In an alternative embodiment of the active balance system illustrated in FIG. 5, the rollers 50 and its support including the preload spring 57, the strain gauge 62, the amplifier 64, the DC/AC converter 66 and the primary coil 68 are mounted on the fuselage 12. The secondary induction coil 72 is mounted on the fan 14, along with the amplifier 74, the screw jack 76 and the balance weight 80. The primary coil 68 is connected to the roller 50 to maintain a close spacing from the secondary coil 72.

Vibration, as sensed by a radial displacement of the fan assembly 14 exceeding preload force of the springs 57, produces a radial load on the idler rollers 50 riding on the smooth surface of the fuselage race 59. This load is continuously detected in real time by the strain gauges 62 that are mounted on lever D that restrains rotation of the rocker arms 52 holding the idler rollers 50. As a result, each strain gauge 62 produces an EMF or current signal proportional to the load sensed. That signal is amplified by the amplifier 64 associated with each strain gauge 62. Each amplified signal is then converted from direct current to alternating current by the associated converter 66 before being transmitted to the primary coil 68 associated with each roller 50. Thus, at any given moment, the system 60 produces seven signals for correcting the balance of the fan assembly 14, one signal at each primary coil 68. Vibration sensing in the alternative embodiment is similarly conducted.

The primary coils 68 transfer the signals to the adjacent induction coils 72. The seven signals are then sent to the amplifiers 74 for amplification before being sent to the associated motors 76 which drive the screw jacks 78 that in turn radially adjust the position of the balancing weights 80 provided in the fan blades 32. The balancing weights 80 are displaceable in either direction as illustrated by action arrow A within the cavities 70 of the seven fan blades 32 in order to restore balance to the fan assembly 14. For so long as vibration is detected, the strain gauges 62 will produce a proportional current that results in a correction signal. Thus, the motors 76 are driven continuously to move the balancing weights 80 in the various fan blades 32 until balance is achieved. At that time, vibration ceases, the strain gauges 62 fail to produce a current, the motors 78 stop and the balancing weights 80 remain stationary.

The application will dictate installation requirements. For example, for a fan assembly 14 with a diameter of about 15 feet, the balancing weights 80 may each weigh on the order of about 1.0 to about 4.0 lbs. The range of motion for each balancing weight 80 within each fan blade 32 is less than one foot. In contrast, for a fan assembly of about 84 feet the balancing weights 80 each weigh on the order of about 12.3 lbs and the range of motion is on the order of five feet. Further, while the components of the active system 60 just described are connected to each of the idler rollers 50 in FIG. 3, it should be appreciated that such a system may be provided on fewer than all the idler rollers 50 if desired (e.g. every other idler roller, every third idler roller).

In summary, numerous benefits result from employing the concepts of the present invention. An HSVTOL aircraft 10 equipped with the active system 60 for sensing vibration and balancing the fan assembly 14 represents a significant advance in the art. By reducing and eliminating vibration with an active system 60, the stability of the aircraft 10 is enhanced. This is a particularly important feature for military aircraft 10 as the fan assembly 14 may become damaged in combat, lose balance and produce a vibration that might otherwise make the aircraft 10 difficult to control during hovering, landing and/or take off. Advantageously, by manipulating the radial position of the balancing weights 80 in and out along the various fan blades 32 equipped with the balancing system 60, in many instances it will now be possible to compensate for the out-of-balance condition.

The foregoing description of a preferred embodiment of the present invention has been presented for purposes of illustration and description. It is not intended to be exhaustive or to limit the invention to the precise form disclosed. Obvious modifications or variations are possible in light of the above teachings.

For example, as illustrated in the FIG. 5 embodiment, the idler rollers 50 may be mounted to or carried on the fuselage 12 if desired. In this embodiment, each rocker arm 52 is pivotally connected to the fuselage 12 by means of a trunnion 51 which allows the rocker arm to freely pivot. A preload spring 57 is mounted between each of the rocker arms 52 and the fuselage 12 to provide a force to bias the idler rollers 50 toward the continuous race 59 extending around the fan hub 34. Thus, the desired preload is again provided to maintain the centering of the fan assembly 14 on the fuselage. In this embodiment, the imbalance signal from the strain gauge 62 is amplified on the body 12 and transmitted to the fan assembly 14 by means of magnetic induction between the primary and induction coils 68, 72. The signal is then sent to the associated motor 76 to drive the screw jack 78 and adjust the position of the weight 80.

Further, while the horizontal bearing assembly 37 of the illustrated embodiment includes a plurality of idler rollers 50, it should be appreciated that other structures could be utilized for the same purpose. Such alternative structures include but are not necessarily limited to air bearings and/or foil bearings or a combination of these structures with roller bearings.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiments do not and are not intended to limit the ordinary meaning of the claims and their fair and broad interpretation in any way.

What is claimed:

1. A high-speed vertical take-off and land aircraft, comprising:
   a body including a continuous race;
   an engine supported by said body;
   a fan assembly carried by said body, said fan assembly including a hub and a plurality of blades to provide vertical lift for said aircraft;
   a first bearings mechanism for vertically supporting said fan assembly;
   a second bearings mechanism for horizontally centering said fan assembly, said second bearing mechanism including a plurality of idler rollers wherein each of said plurality of idler rollers is held on a rocker arm pivotally mounted to said hub, and said second bearings mechanism further including a plurality of springs biasing said plurality of idler rollers to engage and roll along said continuous race; and
   an active system for sensing vibration and balancing said fan assembly.

2. The aircraft of claim 1, wherein said active system includes at least one vibration sensor and at least one displaceable balancing weight.

3. The aircraft of claim 2, wherein said at least one vibration sensor is connected to one idler roller of said plurality of idler rollers.

4. The aircraft of claim 3, wherein said at least one sensor is a strain gauge.

5. The aircraft of claim 4, wherein said strain gauge is connected to said rocker arm holding said one idler roller.

6. The aircraft of claim 5, wherein said strain gauge is connected to an amplifier, a DC/AC converter and a primary coil.

7. The aircraft of claim 6, wherein said at least one balancing weight is carried on one blade of said plurality of blades.

8. The aircraft of claim 7, wherein said at least one balancing weight is connected to a screw jack.

9. The aircraft of claim 8, further including a motor connected to and driving said screw jack.

10. The aircraft of claim 9, further including an amplifier and an induction coil connected to said motor.

11. The aircraft of claim 1, wherein said active system includes a vibration sensor connected to at least some of said plurality of idler rollers.

12. The aircraft of claim 11, wherein said active system includes between 4 to 10 vibration sensors, each of said vibration sensors being connected to one idler roller of said plurality of idler rollers.

13. The aircraft of claim 12, wherein said plurality of idler rollers are radially arranged about an arc of 360 degrees.

14. The aircraft of claim 13, wherein said active system includes a plurality of displaceable balancing weights.

15. The aircraft of claim 14, wherein each of said plurality of displaceable balancing weights is carried on one of said plurality of blades.

16. The aircraft of claim 15, wherein each of said vibration sensors comprises a strain gauge.

17. The aircraft of claim 16, wherein each of said plurality of idler rollers is carried on a rocker arm pivotally connected to said hub and said strain gauges are each connected to one of said rocker arms.

18. The aircraft of claim 17, wherein each of said strain gauges is connected to an amplifier, a DC/AC converter and a primary coil.

19. The aircraft of claim 18, wherein each of said displaceable balancing weights is connected to a screw jack and each of said screw jacks is connected to a motor.

20. The aircraft of claim 19, wherein each of said motors is connected to an amplifier and an induction coil.

21. A method for controlling vibration in a high-speed vertical take-off and land aircraft equipped with a fan assembly, comprising:
   sensing vibrations produced by said fan assembly exceeding a preload force of a least one spring; and
   radially displacing weights along one or more blades of said fan assembly to balancing said fan assembly and control vibration.

* * * * *